Feb. 27, 1968 C. P. HAYUNGA 3,370,982

WEB CLEANING APPARATUS AND METHOD

Filed Oct. 18, 1963 2 Sheets-Sheet 1

*INVENTOR*

CARL P. HAYUNGA 3,370,982

WEB CLEANING APPARATUS AND METHOD

Carl P. Hayunga, Poughkeepsie, N.Y., assignor to International Business Machines Corporation, New York, N.Y., a corporation of New York
Filed Oct. 18, 1963, Ser. No. 317,251
14 Claims. (Cl. 134—9)

ABSTRACT OF THE DISCLOSURE

A web cleaning apparatus having a pre-cleaner section for removing firmly adhered particles from all surfaces of the web, and a final cleaner for removing particles held to the web by static electricity. The pre-cleaner section includes a pair of scraper blades, a pair of guide discs, and conduits for directing an air stream across the web, whereas the final cleaner employs spaced air channels to establish vibrations in the web. Additionally, unique methods for cleaning webs are disclosed.

This invention relates generally to improvements in the art of webs, and more particularly to an apparatus for and method of removing undesirable particles and foreign matter from the surfaces of information bearing tapes.

The apparatus and method of the invention have an important field of use in the cleaning of magnetic tapes and will be described as applied to such use. However, in certain of their aspects the apparatus and method of the invention can be applied to the cleaning of other types of information bearing tapes, such as motion picture film, for example.

Magnetic tape used in data processing machines or other information sensing apparatus is of narrow width, such as one-half inch, and is produced by slitting jumbo rolls of magnetic tape, such as twenty-four inch wide rolls, for example, into a number of narrow strips. Magnetic recording tape includes a recording surface of a magnetic oxide or the like carried by a plastic backing strip such as polyethylene terephthalate resin film, manufactured by E. I. du Pont de Nemours & Co., and sold under the registered trademark Mylar.

The cutting action of the slitting blades on the wide roll of magnetic tape generates or produces small flakes of oxide from the recording surface of the tape and flakes of Mylar or other plastic material from the backing strip, these flakes adhering to both of the opposite major surfaces of the tape and also to the opposite lateral edges of the tape. These flakes if allowed to remain would cause errors in the equipment with which the tape is used, and hence the flakes must be removed from the tape before delivery to the consumer. It is essential, therefore, that the magnetic tape be subjected to a cleaning and flake removal operation at the factory before shipment to the consumer, in addition to other tests performed on the tape such as tests for holes, creases, or other defects in the tape.

Approximately fifty percent of the flakes found on the tape in its small reel form after the initial slitting operation from the large roll are firmly bonded to the tape surface and require a substantial force for their removal, while the remaining flakes and foreign particles are held to the surfaces of the tape by static electricity. During the testing and cleaning of a large number of reels of magnetic tape during a normal production day, random oxide particles from the tape and dirt from the air settle on the drive portions of the testing and cleaning apparatus through which the tape passes. To insure that the tape which finally emerges from the testing and cleaning apparatus is completely free of loose particles, means must be provided adjacent the output end of the testing and cleaning apparatus for removing any particles which may have been deposited on the moving tape during its passage through the apparatus.

Prior to the present invention, no entirely satisfactory apparatus or method had been developed for removing undesirable particles, particularly firmly bonded particles, from magnetic tapes or the like.

Accordingly, it is an object of this invention to provide an improved cleaning apparatus and method of cleaning information bearing tape in accordance with which particles bonded to the surfaces of the tape and also particles held to the surfaces of the tape by static electricity are substantially all removed from the tape.

It is another object of this invention to provide a cleaning apparatus for and method of cleaning magnetic tapes in which undesirable particles of oxide, Mylar, or the like, including those firmly bonded to the tape as well as those held to the tape by static electricity, are removed from the surfaces and edges of the tape with a high degree of efficiency.

It is another object of the invention to provide a cleaning apparatus for magnetic tape or the like including a tape precleaner in which scraping and air blast means cooperate to remove firmly adhered particles from the surfaces of the tape, in combination with a final or "flutter" cleaner in which air blast means causes the removal of particles held to the tape by static electricity.

It is another object of the invention to provide a cleaning apparatus for magnetic tape or the like including a tape cleaner in which scraping blades engage the surface of the tape to remove bonded particles therefrom and in which high velocity air streams cooperate with the scraping blades to remove the undesirable particles from the surfaces of the tape.

It is another object of the invention to provide a cleaning device for magnetic tape or the like including means for removing undesirable particles from both opposite major surfaces of the tape and also from the opposite side edges of the tape.

It is another object of the invention to provide a cleaning device for magnetic tape or the like including cleaning blades which automatically adjust their spacing to the variable thickness of the tape but which prevent passage of adhered particles past the blades.

It is another object of the invention to provide an apparatus for cleaning magnetic tape or the like including cleaning blades which bear against the tape to scrape away adhered particles from the tape without causing any tape wear or damage.

It is still another object of the invention to provide a tape cleaning apparatus including a supplemental cleaning means adjacent the exit end of the tape path to remove particles which are held to the surfaces of the tape by static electricity.

Still a further object of the invention is to provide a "flutter" cleaning appartus in which high velocity air streams are used to produce oscillating standing waves across the width of an information bearing tape to thereby remove undesirable particles from the tape by vibratory force.

Still a further object of the invention is to provide a supplemental or "flutter" cleaning apparatus in which high velocity air streams opposed in direction are used to produce standing waves which are skewed to the longitudinal edges of the information bearing tape so that every area of the tape oscillates at some time during its travel through the cleaner.

In achievement of these objectives, there is provided in accordance with this invention a cleaning apparatus for information-bearing tape, such as magnetic tape, which may be incorporated as part of a testing apparatus which tests for other defects in the tape. The tape cleaning appartus includes a precleaner device having a fixed scraper blade which cooperates with a pivotally mounted scraper blade to scrape the tape passing between the blades, with one of the blades engaging the uncoated plastic or Mylar surface of the tape, while the opposite blade engages the magnetic-oxide-coated surface of the tape. The two blades cooperate with edge-engaging guides to scrape substantially all of the particles from the opposite major surfaces of the tape, and also from the lateral side edges of the tape. The support for each blade is provided immediately in advance of the blade with respect to the direction of travel of the tape with an air channel through which high velocity air is blown laterally across the opposite major surfaces of the tape to remove any accumulated particles or debris which may have accumulated in advance of the scraping blades. The cleaning apparatus also includes "flutter" cleaner positioned near the end of the tape path through the testing apparatus to remove particles held to the surfaces of the tape by static electricity. The flutter cleaner includes two air channels extending laterally across the path of the tape, and high velocity air is directed through each channel in a direction opposite that in which it passes through the other channel, the air in each channel passing laterally across both opposite major surfaces of the tape. The high velcotiy air streams passing across the surfaces of the tape in reverse directions in the two channels set up high frequency oscillating standing waves across the tape width to thereby remove undersirable particles from the tape by vibratory force. By using high velocity air streams that are spaced a prescribed distance apart along the tape axis and pass across the tape in reverse directions, the standing waves become skewed to the edges of the tape so that every area of the tape comes into oscillation at some time during its travel through the cleaner.

Further objects and advantages of the invention will become apparent from the following description taken in conjunction with the accompanying drawings in which.

Figure 1:
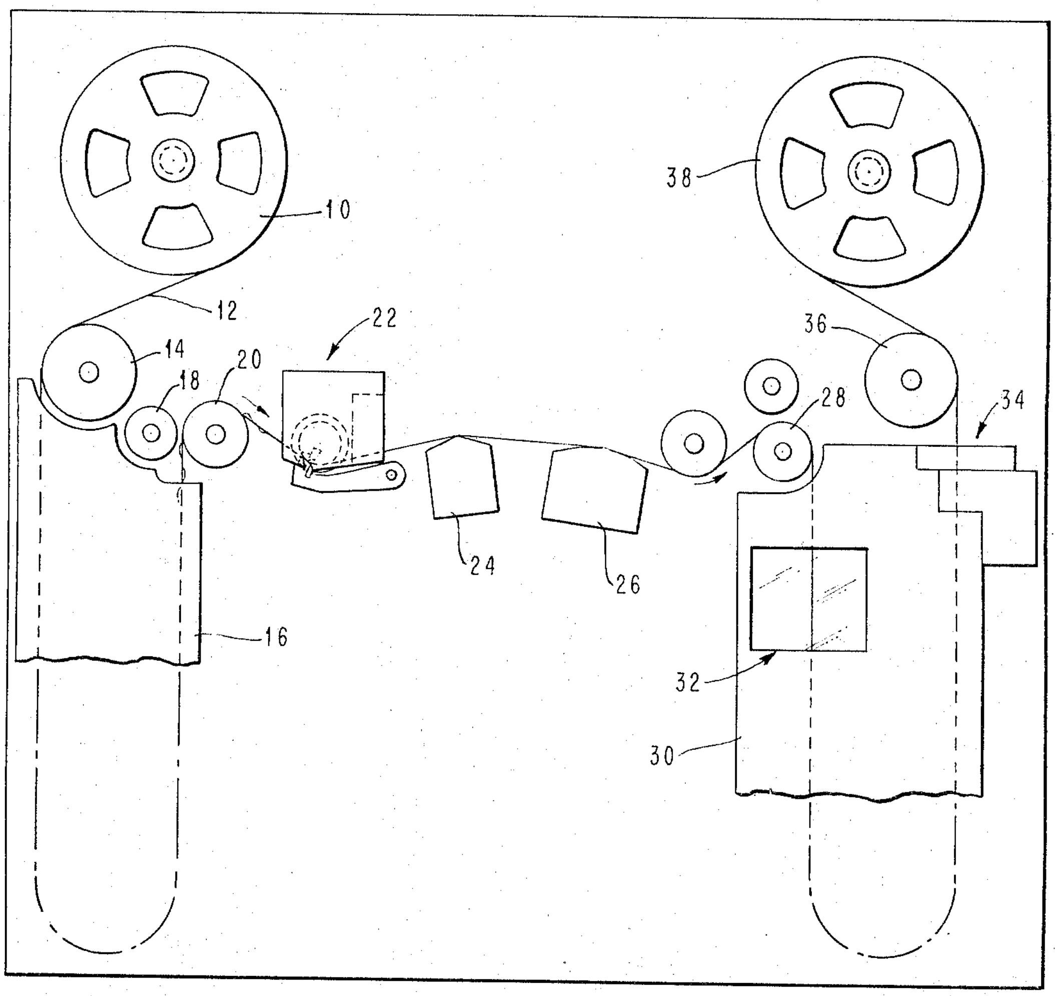
FIG. 1 is a schematic view of a magnetic tape testing apparatus including the cleaning devices of the invention.

Referring now to the drawings, the general organization of the tape testing and cleaning apparatus is shown in FIG. 1 and includes a play-out reel 10 from which the magnetic tape 12 moves over roller 14 into left vacuum column 16. Tape 12 includes a plastic backing strip of polyethylene terephthalate resin film which, as previously mentioned, is manufactured by E. I. du Pont de Nemours & Co. and sold under the registered trade mark "Mylar." The upper surface 12*a* of the tape is the uncoated surface of the Mylar strip. The under surface 12*b* is the magnetic-oxidecoated surface of the plastic strip.

Tape 12 is drawn from vacuum column 16 through rollers 18 and 20 and passes through the tape precleaning device generally indicated at 22, which forms part of the invention. After leaving the precleaning device 22, the tape passes over noise head 24 and over read/write head 26, and thence over roller 28 and into the right vacuum column generally indicated at 30. The right vacuum column 30 includes a viewing station generally indicated at 32 at which the tape may be inspected. The tape emerges from the right vacuum column 30 and passes into the final or "flutter" cleaner 34, from whence the tape passes over roll 36 and onto wind-up reel 38.

Figure 2:
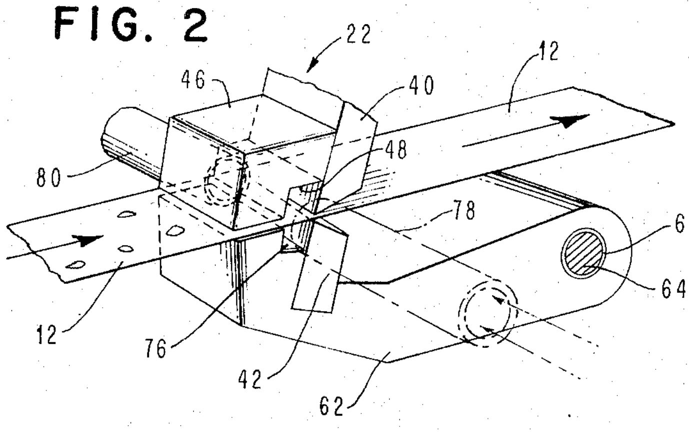
FIG. 2 is an enlarged perspective view, partially schematic, showing the precleaner section of the tape testing and cleaning apparatus.
Figure 4:
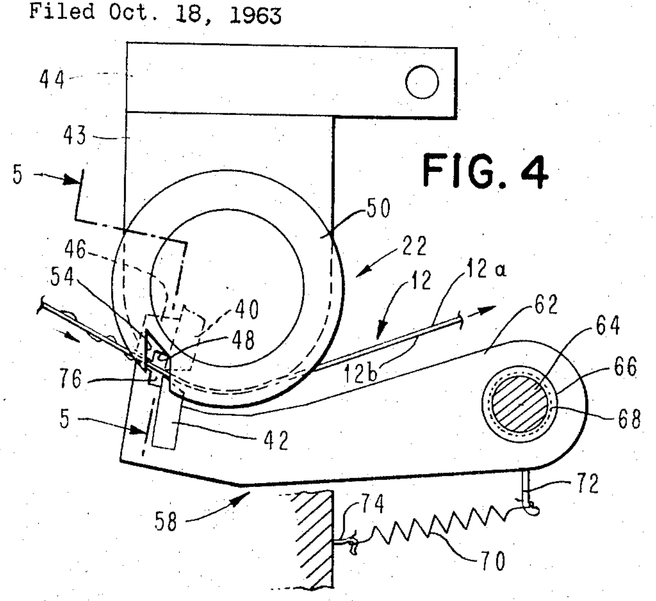
FIG. 4 is a side elevation view of the precleaner section of the tape testing and cleaning apparatus.
Figure 5:
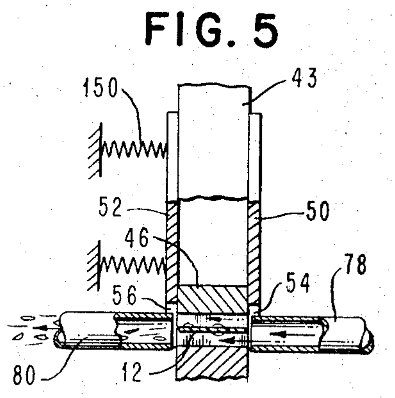
FIG. 5 is a view in section taken substantially along line 5—5 of FIG. 4.

As best seen in the views of FIGS. 2, 4, and 5, the tape precleaner device 22 icnludes a fixed tungsten carbide or another hard material scraper blade 40 which engages the upwardly disposed "Mylar" surface 12*a* of the tape 12 as it passes through the precleaning device 22, and a spring-biased pivotally mounted lower tungsten carbide scraper blade 42 which engages the magnetic-oxide-coated underneath surface 12*b* of the tape passing through device 22.

The upper scraper blade 40 is secured to a fixed support including a stationary bracket arm 43 extending downwardly from a stationary block 44, blade 40 being suitably secured to bracket arm 43. As best seen in FIG. 2, bracket arm 43 includes a portion 46 lying forwardly of blade 40 and having a lateral width substantially equal to the lateral width of tape 12. Bracket portion 46 is provided with a channel 48 opening upwardly from the lower surface of the bracket portion 46 and providing a through path for an air stream which is directed transversely of the upper surface of the tape as will be explained more fully hereinafter.

Disc-shaped ceramic guide members 50 and 52 are secured to opposite lateral surfaces of bracket 43 as best seen in the views of FIGS. 4 and 5. Guide 50 is fixed to bracket 43 but guide 52 is spring loaded as by springs 150 urging it against bracket 43. The spacing between the inner surfaces of the oppositely disposed ceramic guide discs is just slightly less than the transverse or lateral width of tape 12 so that because of the spring action of guide 52 towards guide 50, the tape is slightly squeezed and, therefore, discs 50 and 52 serve to guide the tape as it passes through precleaning device 22 and also serve the important function of scraping particles, such as Mylar or oxide particles, from the lateral edges of the moving tape, causing those particles to move to either the upper or lower major surfaces 12*a* or 12*b* of the moving tape. The ceramic guide discs 50 and 52 are so located and are of such diameter that the flanges of the respective discs extend below the lower edge of support bracket 43 and below the lower surface, with respect to the view shown in FIG. 4, of tape 12. The opposite ceramic discs 50 and 52 are provided with aligned notches 54 and 56, respectively, which are respectively aligned with the inlet and outlet ends of air channel 48. Notches 54 and 56 of the ceramic guides are made of sufficient size to overlie the inlet and outlet openings to a corresponding air channel in the lower blade assembly, to be described.

The lower tungsten carbide blade 42 is mounted adjacent the outer end of arm 62 which is pivotally movable about a pivotal support shaft 64. The bearing aperture 66 of shaft 64 has an inner diameter which is sufficiently larger than the outer diameter of pivotal support shaft 64 to provide a substantial clearance between the adjacent bearing surfaces of these members, and high viscosity oil 68 is interposed in this clearance space or bearing cavity. The presence of the high viscosity oil serves to damp out vibrations in the pivoted arm 62 which may be caused by the movement of tape 12 at a high velocity over the surface of lower blade 42.

A spring 70 is secured to a projection 72 carried by arm 62, the opposite end of spring 70 being anchored to a fixed point 74. The spring biases arm 62 in a clockwise direction with respect to the view shown in the drawings, so that the lower blade 42 bears lightly against the under surface of the moving tape 12.

The forward end of arm 62 just immediately in advance of the forward or leading edge of blade 42 is provided with an upwardly open air channel 76 having subtsantially the same configuration as the channel 48 of the upper blade assembly, and so located as to lie in substantially the same plane as channel 48 transverse of the path of movement of tape 12. An air inlet duct 78 (FIG. 5) is positioned adjacent notch 54 in ceramic guide 50, and thus adjacent the inlet ends of channels 48 and 76 of the upper and lower blade assemblies. High velocity air is directed from duct 78 which extends through notch 54 of the ceramic guide 50 and into the respective channels 48 and 76 adjacent upper and lower blades 40 and 42 so as to pass laterally across the upper and lower major surfaces of the tape and thence outwardly into an exhaust passage or tube 80 positioned through notch 56 of ceramic guide 52.

Figure 3:
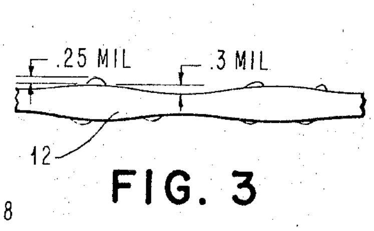
FIG. 3 is an exaggerated edge view of a length of magnetic tape illustrating the particles bonded to the surface of the tape and also illustrating the modulations present in the tape thickness.

As best seen in the diagram of FIG. 3, the bonded particles on the tape are approximately 0.25 mil high, while the total variation in thickness of the tape is $\pm 0.3$ mil. It is the function of the precleaner to remove these 0.25-mil-high flakes while following the modulation present in the tape thickness.

The mass of the pivoted arm 62 is properly selected so that the mass of the arm in combination with the high velocity of the bonded particles due to the tape speed results in a high inertia force which is applied as a shearing force at the intersection of the particles and the tape sufficient for the particles' removal.

The mass of the arm 62 has a magnitude such that the slow modulations of the tape create no inertia force and hence the arm 62, assisted by spring 70, can freely follow the modulations in tape thickness. One example of such proportion of mass of the arm end found to be effective is 60 grams using an arm length of one and one half inches with pressure exerted at a short radius by a spring of about 250 grams pull. However, the small particles bonded to the tape cannot move the relatively heavy mass of the arm and hence the particles are completely removed from both surfaces by the blades 40 and 42. The spring 70 is so calibrated that the tape 12 is lightly squeezed between the upper and lower blades 40 and 42 with a force of approximately 3 grams, producing no tape damage and a minimum of blade wear.

In the operation of the tape precleaning device of FIGS. 2, 4 and 5, the tape is moved between the upper and lower blades 40 and 42 at a speed such as 112 inches per second and the bonded particles are sheared from the upper and lower surfaces of the tape by the blades. The particles scraped from the major surfaces, and any other debris due to the edge scraping action of discs 50 and 52, momentarily accumulates in advance of the leading edges of blades 40 and 42 before being blown through the channels 48 and 76 by the high velocity air from air inlet duct 78. The high velocity air and the particles which are picked up thereby then pass to the exhaust duct 80. Thus, the air stream passing through channels 48 and 76 cooperates wtih the scraping blades 40 and 42 to effectively remove substantially all bonded and other particles from the opposite major surfaces of the tape, as well as from the lateral edges of such surfaces.

In the preferred embodiment of the precleaner device which has been described, the upper scraper blade is mounted on a fixed support and the lower scraper blade is mounted on a pivotally movable support. However, the upper blade may instead be mounted on a pivotally mounted support arm having a heavy mass and the lower blade may be fixedly mounted. In this case, the force of gravity causes the pivotally mounted upper blade to contact the upper surface of the tape and no spring is required to bias the pivotally mounted arm toward the surface of the tape. The air stream which is directed laterally of the moving tape provides an air bearing supporting the heavy mass of the pivoted support arm, thereby permitting the tape to be slightly squeezed by the blades.

After emerging from precleaner 22, tape 12 then passes over a noise head 24 and read-write head 26. If any particle has not been removed by the precleaner, it is sensed by the read-write head 26 and a signal results which cycles the tape back through the precleaner for another try at removing the particle. Control means, not shown, may be provided so that the portion of the tape having the unremoved particle may be recycled through the tape precleaner 22 for a predetermined number of times, such as a maximum of 32 times, for example. If the particle or flake is still not removed after having been recycled for the predetermined maximum number of times, the tape is then permitted to advance to the inspection station 32, where the particle may be manually removed.

As previously explained, after passing through the precleaner 22 and past the noise head and read/write head, the tape passes through the vacuum column 30 and thence to the flutter cleaner generally indicated at 34. The purpose of the flutter cleaner is to remove any particles or flakes which are held to the tape by static electricity, since the permanently bonded flakes have been previously removed by the precleaner 22. Some of the flakes remaining on the tape surfaces when it reaches the flutter cleaner 34 may have been picked up by the tape during its passage through the testing apparatus.

Figure 7:
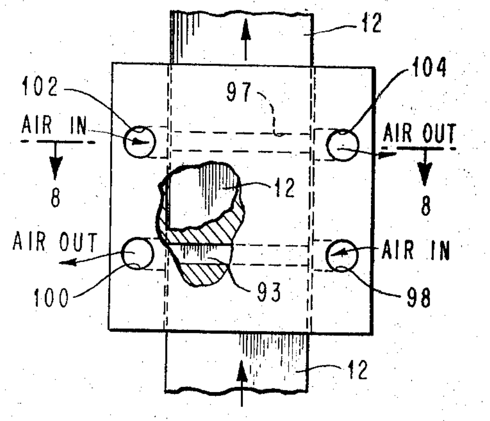
FIG. 7 is a front elevation view, partially cut away, of the flutter cleaner device of FIG. 6.
Figures 6, 9, 10:
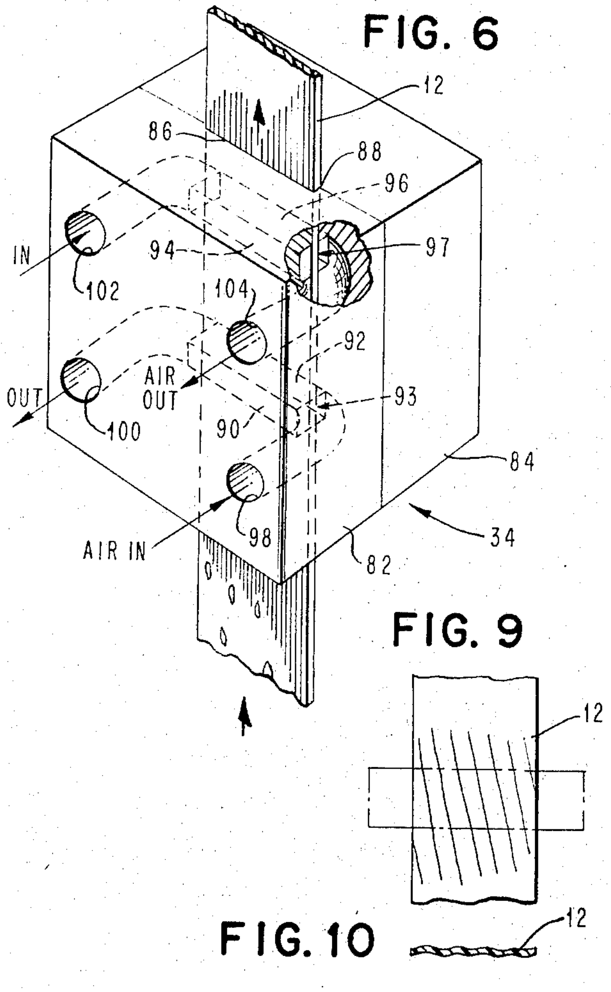
FIG. 6 is a perspective view of the final or "flutter" cleaner section of the tape testing and cleaning apparatus.
FIG. 9 is a schematic side view illustrating the orientation of the standing waves set up on the moving magnetic tape by the flutter cleaner device of FIGS. 6–8.
FIG. 10 is a view in transverse section of the tape taken along line 10—10 of FIG. 9 and illustrating the standing waves on the tape.
Figure 8:
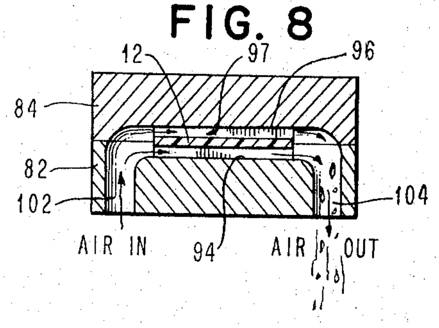
FIG. 8 is a view in transverse section along line 8—8 of FIG. 7.

As seen in FIGS. 6, 7, and 8, the flutter cleaner includes a pair of complementary casing sections 82 and 84 having abutting surfaces which are provided with complementary recess 86 and 88 extending in the direction of travel of the tape, recesses 86 and 88 being sufficiently wider than tape 12 to permit passage through the flutter cleaner of the tape to be cleaned. Intermediate the axial length of the casing sections 82, 84 in the direction of travel of the tape, the casing sections are provided with two pairs of mating recesses which define two air channels through which high velocity air is passed in paths transverse to the direction of travel of the tape. Thus, casing sections 82, 84 are respectively provided with a first set of complementary recesses 90–92 which together define an air channel 93, and a second set of complementary recesses 94–96 which together define a second air channel 97 in longitudinally spaced relation to the first air channel 93 with respect to the direction of tape travel. Each of the air channels 93, 97 laterally intersects and merges with the longitudinal recesses 86, 88 through which the tape passes, the tape bisecting the respective channels 93, 97 during its passage through the flutter cleaner.

Air inlet and outlet ducts 98 and 100 communicate with the opposite ends of the air channel 93, and inlet and outlet ducts 102 and 104 communicate with the opposite ends of the air channel 97. The air inlet and outlet connections for the first air channel 93 are reversed as compared to those for the second air channel 97. Thus, high velocity air is admitted to the inlet duct at the right-hand side of the flutter cleaner, with respect to the view in FIG. 6, and passes through the air channel 93 from right to left in contact with the opposite major surfaces of the tape, the air then emerging from the exhaust outlet 100. On the other hand, air is admitted at the left-hand side of the flutter cleaner to the inlet duct 102 and thence passes laterally from left to right through the air channel 97 and in contact with the opposite major surfaces of the tape, thence passing outwardly through the outlet duct 104 at the right-hand side of the flutter cleaner. Thus, the high velocity air sweeps across the surfaces of the tape from right to left in the channel 93 and sweeps across the surfaces of the tape from left to right through the channel 97.

By using two separate channel systems each of which directs an air stream to opposite surfaces of the tape, as just described, but in opposite lateral directions in the respective channel systems, standing waves are set up in the tape across the lateral width thereof, these waves being of small magnitude but of high frequency. An example of a typical wave length is 50 mils and frequency of 13 kc. The standing waves, which are schematically shown in FIGS. 9 and 10, are skewed to the lateral edges of the tape in a sort of angular shaking action so that every area of the tape comes into oscillation at some time during its travel through the cleaner. Wave skewing occurs because the spaced air forces are oppositely directed against the tape edges at intervals 98–102 and productive of an angular movement which is a very effective form of cross flutter. The particles or flakes which are held on the tape by static electricity are accelerated by the action of flutter cleaner 34 to such a degree that their inertia overcomes the static force holding them to the tape, and they leave the surfaces of the tape and are carried out of the system by the air streams. Wave skewing greatly increases the efficiency of the device. Thus, when the tape emerges from the flutter cleaner and is wound onto the wind-up reel 38, not only have substantially all of the bonded particles been removed therefrom by the precleaner 22, but also substantially all of the statically adhered particles have been removed from the tape by the flutter cleaner 34.

It will be understood that the tape testing apparatus shown in FIG. 1 may perform other testing functions in addition to the cleaning operations previously described. Thus, for example, the noise head 24 and the read-write head 26 may also be used for testing for holes, creases, and other defects in the tape.

It can be seen from the foregoing that the tape precleaner and the flutter cleaner incorporated as part of the testing apparatus as hereinbefore described have great utility and co-operate to remove substantially all of the foreign particles adhered to the tape, whether the particles are bonded to the tape or are held thereon by static electricity. It can also be seen that there is provided in accordance with this invention a highly effective and efficient method of cleaning information bearing tapes, such as magnetic tapes or the like.

While there has been shown and described a particular embodiment of the invention, it will be obvious to those skilled in the art that various changes and modifications may be made therein without departing from the invention and, therefore, it is aimed to cover all such changes and modifications as fall within the true spirit and scope of the invention.

What is claimed is:

1. A method of cleaning a web or the like comprising the steps of:
   (a) moving the web,
   (b) scraping the opposite major surfaces of the web during its movement with blade means disposed transversely to the web,
   (c) scraping the edges of the web during its movement with spaced guide means disposed parallel to the web,
   (d) accumulating all particles removed from the surfaces and the edges of the web along the forward portion of said blade means,
   (e) directing a stream of gaseous fluid across both major surfaces of the web adjacent said blade means, and
   (f) removing the accumulated particles from said blade means by entrapping said particles in said stream of gaseous fluid.

2. A method of cleaning a web or the like which comprises the steps of guiding the web for movement along a path, and simultaneously directing two separate streams of high velocity gaseous fluid respectively in opposite directions from each other laterally across the surfaces of the web as it moves along said path, the velocity of said air being sufficient to set up vibrations in the web which are effective to remove particles adhered to the web.

3. A method of cleaning a web or the like which comprises the steps of moving the web between a pair of opposed blade members which respectively contact the opposite major surfaces of the web to remove particles adhered to the respective surfaces, directing a stream of gaseous fluid across both major surfaces of the web adjacent said blades to remove material scraped from the surfaces of the web by said blade members; subsequently guiding the web for movement along a path spaced beyond said blades and simultaneously directing two separate streams of high velocity gaseous fluid respectively in opposite directions from each other laterally across the surfaces of the web in two planes spaced from each other longitudinally of the web as it moves along said path, the velocity of said fluid being sufficient to set up vibrations in the web which are effective to remove particles adhered to the web.

4. A web cleaning apparatus comprising a first and a second blade member, means for mounting said blade members in opposed relation to each other to define a passage therebetween for movement of the web being cleaned, said blade members respectively contacting opposite major surfaces of the web as the web is passed therebetween, and means positioned contiguous said blade members for directing a stream of air across the surfaces of the web to remove material scraped from both surfaces of the web by said blade members.

5. A web cleaning apparatus as defined in claim 4 further comprising guide means for engaging the lateral edges of said web adjacent said blade members to push foreign particles from the edges to the major surfaces of the web.

6. A web cleaning apparatus as defined in claim 5 wherein said guide means comprise a pair of ceramic discs, a bracket, said discs being mounted on opposite sides of the bracket in a plane parallel to the direction of movement of the web, spring means urging said discs toward each other so as to slightly squeeze the web therebetween as the web moves along the surface of the bracket, and wherein said means for directing a stream of air across the surfaces of the web comprises a notch in each of said discs, said notches aligned with each other to define a flow path transverse to the direction of movement of the web.

7. A web cleaning apparatus as defined in claim 4 wherein said means for mounting said blade members comprises first and second support members movable relative to each other and positioned parallel to the direction of movement of the web, and said means for directing a stream of air across the surfaces of the web comprises a channel in each of said support members extending transversely to the direction of movement of the web, said channels directing the air laterally across the major surfaces of the web.

8. A web cleaning apparatus as defined in claim 7 wherein said means for directing a stream of air across the surfaces of the web further comprises an inlet duct positioned adjacent one corresponding end of each channel for directing air into each channel and an outlet duct positioned adjacent the other corresponding end of each channel for receiving the air and the material scraped from the surfaces of the web by said blade members.

9. A web cleaning apparatus as defined in claim 7 further comprising guide means for engaging the lateral edges of said web adjacent said blade members to push foreign particles from the edges to the major surfaces of the web, said guide means having aligned notches formed therein, said notches being of sufficient size to overlie the openings of said channels in said first and second support members.

10. A web cleaning apparatus as defined in claim 4 wherein said means for mounting said blade members comprises a bracket for retaining one of said blade members fixed in position and a support shaft with an arm secured thereon for pivotally mounting the second blade member, means disposed between said arm and said support shaft to damp out vibrations in said arm caused by movement of the web over said second blade member.

11. In combination, a web cleaning apparatus comprising a first cleaning section including first and second blade members, means mounting said blades mounted in opposed relation to each other to define a passage therebetween for movement of the tape being cleaned, said blade members respectively contacting opposite major surfaces of the tape as the tape is passed therebetween, means positioned contiguous said blade members for directing a stream of air laterally across the surfaces of the tape to remove material scraped from the surfaces of the tape by said blade members; a second cleaning section spaced along the path of travel of said tape from said first cleaning section; said second cleaning section comprising a guide passage defining a path for movement of the tape, means defining two fluid flow paths laterally across the surfaces of the tape, said two fluid flow paths being spaced from each other lengthwise of said guide passage and intersecting said guide passage, means for introducing high velocity air through said fluid flow paths in opposite directions in the respective paths, the velocity of said air being sufficient to set up standing wave oscillations in the moving tape which are effective to remove particles from the tape; and means for moving the tape through said first cleaning section, from said first cleaning section to said second cleaning section, and through said second cleaning section.

12. In combination, a web cleaning apparatus as defined in claim 12 wherein said first cleaning section further comprises guide means spaced parallel to the direction of movement of the web for engaging the lateral edges of the web adjacent said blade members to push foreign particles from the edges to the major surfaces of the web.

13. A device for removing particles from the surfaces of a moving web or the like, comprising a housing having two housing sections each having a face thereof engaging a face of the other in abutting relation, the abutting faces of said housing sections having cooperating first recesses therein extending lengthwise of the path of movement of the web through the housing and defining a passage for said web, each of said abutting faces also including a pair of additional recesses therein spaced relation to each other lengthwise of the path of movement of the web and extending laterally of and intersecting said first recess of the respective face, said pair of recesses of each face cooperating with a similar pair of recesses in the other face to define a first and a second air channel extending laterally of and intersecting the path of movement of said web through the housing, whereby the web in passing through said housing passes laterally across each of said air channels, said first and second air channels being spaced from each other lengthwise of the direction of travel of the web through the housing, and means for introducing high velocity air through said air channels in opposite directions in the respective channels, the velocity of said air being sufficient to set up vibrations in the moving web which are effective to remove particles from the web.

14. A device for removing particles from the surfaces of a moving web or the like comprising a passage means defining a path for movement of the web, means defining two fluid flow paths extending laterally across the surfaces of the web, said two fluid flow paths being spaced from each other lengthwise of said passage means and intersecting said passage means, and means for introducing high velocity gaseous fluid through said paths in opposite directions in the respective paths, the velocity of said fluid being sufficient to set up vibrations in the moving web which are effective to remove particles from the tape.

References Cited

UNITED STATES PATENTS

| | | | |
|---|---|---|---|
| 3,003,176 | 10/1961 | Goyetter | 15—308 |
| 3,035,295 | 5/1962 | Buslik et al. | 15—308 |
| 3,059,266 | 10/1962 | Cleveland | 15—308 |
| 3,110,050 | 11/1963 | Sainio | 15—93 |
| 3,266,196 | 8/1966 | Barcaro | 15—306 |

MORRIS O. WOLK, *Primary Examiner.*

G. R. MYERS, *Assistant Examiner.*

UNITED STATES PATENT OFFICE
CERTIFICATE OF CORRECTION

Patent No. 3,370,982 February 27, 1968

Carl P. Hayunga

It is hereby certified that error appears in the above numbered patent requiring correction and that the said Letters Patent should read as corrected below.

Column 3, line 2, for "appartus" read -- apparatus --; line 27, for "velcotiy" read -- velocity --; line 30, for "undersirable" read -- undesirable --; column 4, line 2, for "oxidecoated" read -- oxide-coated --; line 16, for "icnludes" read -- includes --; column 5, line 61, for "wtih" read -- with --; column 6, line 34, for "recess" read -- recesses --; column 9, line 35, for the claim reference numeral "12" read -- 11 --; column 10, line 5, for "therein" read -- therein in --; line 36, for "Goyetter" read -- Goyette --.

Signed and sealed this 24th day of June 1969.

(SEAL)
Attest:

EDWARD M.FLETCHER,JR.
Attesting Officer

WILLIAM E. SCHUYLER, JR.
Commissioner of Patents